No. 675,257. Patented May 28, 1901.
S. R. WELCH.
FRUIT LADDER.
(Application filed Nov. 13, 1900.)
(No Model.)
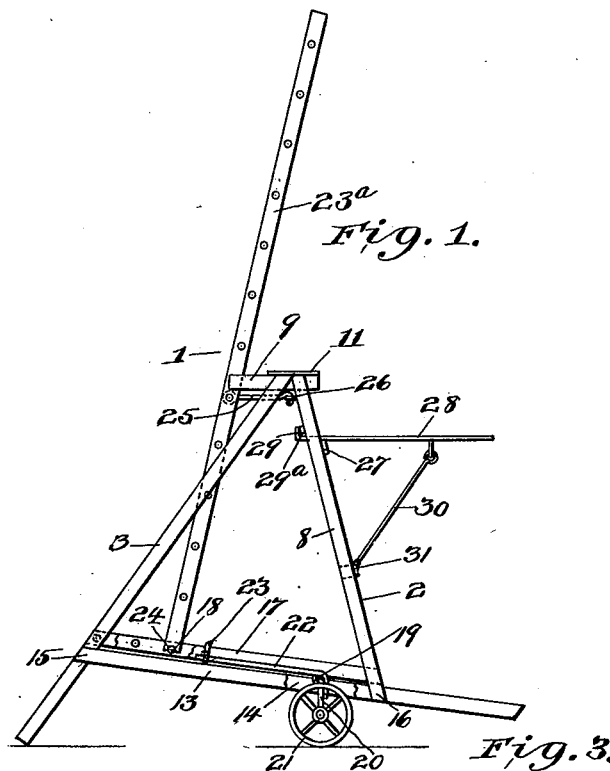
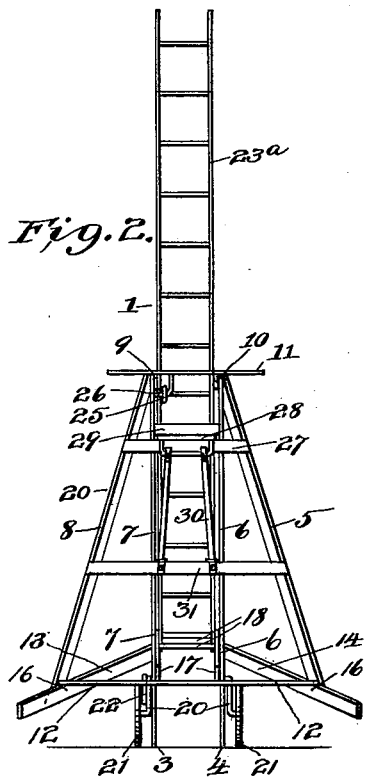
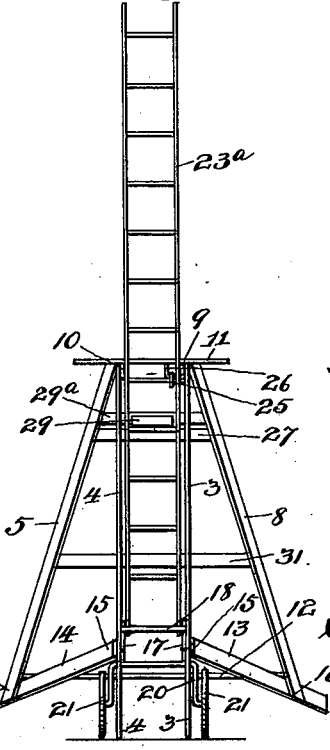
Witnesses
Joe F. Blackwood
S. A. Randolph Jr.
Inventor
Stephen R. Welch
by N. A. Gourick
Attorney

UNITED STATES PATENT OFFICE.

STEPHEN R. WELCH, OF GRAND JUNCTION, COLORADO.

FRUIT-LADDER.

SPECIFICATION forming part of Letters Patent No. 675,257, dated May 28, 1901.

Application filed November 13, 1900. Serial No. 36,389. (No model.)

*To all whom it may concern:*

Be it known that I, STEPHEN R. WELCH, a citizen of the United States, residing at Grand Junction, in the county of Mesa and State of Colorado, have invented certain new and useful Improvements in Fruit-Ladders, of which the following is a specification.

My invention relates to improvements in fruit-ladders.

The invention consists in the features and combination of features, as hereinafter more fully described and claimed.

The object of my invention is to provide a ladder for gathering fruit from trees which is simple and inexpensive in construction and easy to manipulate.

Referring to the drawings, Figure 1 is a side view in elevation; Fig. 2, a rear elevation; Fig. 3, a front elevation.

In the drawings, in which like numerals of reference denote like parts throughout the several views, 1 represents the device as a whole; 2, the frame thereof, which consists of inclined upwardly-extending front bars 3 4 and rear bars 5, 6, 7, and 8. The upper ends of said front and rear bars are connected to short horizontal arms 9 10, which are provided with a platform 11, upon which baskets, boxes, &c., may be placed or on which a person may stand. 12 is a cross-brace connected to the lower ends of said bars 5, 6, 7, and 8.

13 14 are slanting longitudinal side bars secured to the bars 3 and 4 at 15 and to the bars 5 and 8 at 16 and extending rearwardly beyond said bars 5 and 8.

17 is a horizontal ladder, its front end secured to the bars 3 and 4 and its rear end to the bars 6 and 7. 18 represents the rungs of said ladder. 19 represents bearings secured to the under edges of the said ladder 17. 20 is an arched axle mounted to turn in said bearings and provided with wheels 21.

22 is a hand-lever secured on one side of the axle. This lever affords means for moving said axle into a vertical position, which lowers said wheels, and thereby elevates and raises the rear ends of the slanting bars 13 and 14 above the ground when it is desired to move or transport the fruit-ladder from one place to another and also for moving said axle into a substantially horizontal position, and thereby raising said wheels out of operative position after the fruit-ladder has been moved and placed in the position where it is desired to use the same.

23 is a ring which is mounted on the side bar of the ladder 17 and adapted to slide over the end of the lever 22 and hold the same down when the wheels are to be lowered to elevate the bars 13 and 14 of the frame of the fruit-ladder.

23ª is an adjustable hand-ladder, the lower end of each of the side pieces of which is provided with a notch or recess 24 for the purpose of engaging the rungs 18 of the horizontal ladder 17. The angle of inclination or slant of said hand-ladder depends on which one of the series of rungs' 18 the notches or recesses 24 thereof are placed.

25 is a hook secured to one of the rungs of the hand-ladder and adapted to engage an eye 26 under the platform 11 for the purpose hereinafter described. The ladder being placed between the arms 9 and 10, said arms prevent any lateral play or movement thereof.

27 is a brace which extends across the bars 5, 6, 7, and 8 near their upper ends, with its opposite ends secured to the bars 5 and 8.

28 is a pivoted folding platform adapted to slide on the top of brace 27 and provided with an upwardly-projecting ledge or flange 29 at its inner end, adapted to engage the brace 29ª when said platform is drawn out.

30 represents braces, the upper ends hinged to the platform 28 and the lower ends hinged to a cross rod or bar 31, made, preferably, of wood, attached to bars 5, 6, 7, and 8, for the purpose of affording means for moving said platform outward into its operative position or inward into its folded position. The hook 25 is for the purpose of holding the ladder in an upright position and out of the way when the platform 11 is being used.

When it is desired to use the fruit-ladder, it being assumed that the wheels are in their lowered position and the ring 23 engaging and holding the end of the hand-lever, as shown in Fig. 1 of the drawings, it is only necessary to take hold of the lower ends of the bars 3 and 4, using them as handles, and transport the fruit-ladder to the desired position under the tree. Then disengage the ring 23 from the hand-lever, which will cause the wheels and lever to move upward, and the ends of the bars 13 and 14 will move downward and rest on the ground. Then set the lower end of the hand-ladder on one of the series of rungs 18 and push said ladder backward until it rests against the front edge of the platform 11. After picking all the fruit within reach of the hand-ladder and upper platform slide out the folding platform toward the tree and pick the fruit from the center of the tree.

It will be seen that as my fruit-ladder does not require to be placed against or depend on the tree for its support, but is independent thereof, the liability of damage to the tree—such as breaking of the limbs, peeling off the bark, &c.—is entirely obviated.

I do not wish to be limited to the precise construction as herein shown, as the same may be changed somewhat without departing from the spirit of my invention.

Having thus described my invention, what I claim is—

1. A fruit-picking device comprising a frame having an eye, arms projecting from the frame having their outer ends free, a stationary ladder secured to the frame, a detachable ladder provided with a hook and adapted to engage and be adjusted on the stationary ladder and be swung rearwardly between said arms, and held there by engaging the hook of said detachable ladder with the eye on the frame, substantially as shown and described.

2. A fruit-picking device comprising a frame provided with means for raising and lowering the same, a stationary ladder, a detachable ladder adapted to be adjusted at different points on said stationary ladder, arms projecting from the top of said frame, the outer ends of which are free, said detachable ladder adapted to be swung into and out of position between said arms, a platform on top of said arms, a pivoted folding platform having a flange, and a brace adapted to be engaged by said flange and hold said pivoted platform in its outward position, substantially as shown and described.

In testimony whereof I hereto affix my signature in the presence of two witnesses.

STEPHEN R. WELCH.

Witnesses:
G. E. COWELL,
J. W. VANNICE.